United States Patent
Lyu (10) Patent No.: US 8,245,057 B2
(45) Date of Patent: Aug. 14, 2012

(54) METHOD OF POWER MANAGEMENT FOR DYNAMICALLY CONTROLLING POWER IN A PROCESSOR IN ACCORDING TO A WORKLOAD RATE OF THE PROCESSOR

(75) Inventor: Young-Ki Lyu, Seongnam-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 182 days.

(21) Appl. No.: 12/662,106

(22) Filed: Mar. 31, 2010

(65) Prior Publication Data

US 2010/0299545 A1 Nov. 25, 2010

(30) Foreign Application Priority Data

May 20, 2009 (KR) .......................... 10-2009-0043884

(51) Int. Cl.
*G06F 1/32* (2006.01)
(52) U.S. Cl. ......... 713/300; 713/320; 713/322; 713/323
(58) Field of Classification Search .................. 713/300, 713/320, 322, 323
See application file for complete search history.

(56) References Cited

U.S. PATENT DOCUMENTS

| 6,895,520 | B1 * | 5/2005 | Altmejd et al. | 713/324 |
| 7,017,060 | B2 * | 3/2006 | Therien et al. | 713/323 |
| 7,505,795 | B1 | 3/2009 | Lim et al. | |
| 7,975,155 | B2 * | 7/2011 | Rozen et al. | 713/322 |
| 2003/0061523 | A1 * | 3/2003 | Stanley | 713/300 |
| 2003/0191854 | A1 * | 10/2003 | Hsu et al. | 709/233 |
| 2005/0268133 | A1 * | 12/2005 | Beard | 713/323 |
| 2008/0244294 | A1 | 10/2008 | Allarey | |
| 2009/0049314 | A1 * | 2/2009 | Taha et al. | 713/300 |
| 2010/0268968 | A1 * | 10/2010 | Ghiasi et al. | 713/300 |

FOREIGN PATENT DOCUMENTS

KR 2002-0012186 2/2002

OTHER PUBLICATIONS

A Survey of Design Techniques for System-Level Dynamic Power Management (IEEE Transaction on VLSI System, vol. 8, No. 3, Jun. 2000).*

* cited by examiner

*Primary Examiner* — Vincent Tran
(74) *Attorney, Agent, or Firm* — Harness, Dickey & Pierce, P.L.C.

(57) ABSTRACT

A method of power management detects a workload rate of a processor, increases a power level of the processor based on a first value that is an average of the detected workload rate over an up reference time, and decreases the power level of the processor based on a second value that is an average of the detected workload rate over a down reference time. The down reference time may be longer than the up reference time. A power management apparatus includes a processor, a workload detector configured to detect a workload rate of the processor, a power management unit configured to receive the workload rate of the processor and generate a level control signal indicating a power level of the processor, a voltage control unit configured to provide the processor with a supply voltage corresponding to the level control signal, and a clock control unit configured to provide the processor with a clock signal having a frequency corresponding to the level control signal.

17 Claims, 9 Drawing Sheets

| POWER LEVEL | MCLK(MHz) | MVDD(V) |
|---|---|---|
| L(0) | 800 | 1.30 |
| L(1) | 400 | 1.10 |
| L(2) | 266 | 1.05 |
| L(3) | 133 | 1.00 |
| L(4) | 66 | 1.00 |

METHOD OF POWER MANAGEMENT FOR DYNAMICALLY CONTROLLING POWER IN A PROCESSOR IN ACCORDING TO A WORKLOAD RATE OF THE PROCESSOR

CROSS-REFERENCE TO RELATED APPLICATIONS

This application claims priority under 35 U.S.C. §119 to Korean Patent Application No. 2009-0043884, filed on May 20, 2009 in the Korean Intellectual Property Office (KIPO), the contents of which are herein incorporated by reference in their entirety.

BACKGROUND

1. Field

Example embodiments relate to a method of power management, and particularly to a method of power management for dynamically controlling power in electronic devices including a processor.

2. Description

As performance of electronic devices increases, operating frequency and operating voltage of a processor included in the electronic devices also increase. A higher frequency of operation and higher voltage of the processor cause an increase in power consumption of the electronic devices. Low power consumption is important, particularly, in battery-operated handheld electronic devices such as mobile communication terminals, PDAs (personal digital assistants), notebooks, and the like. For example, in mobile communication terminals, power consumption may be reduced by dividing an operation mode into a traffic mode and a standby mode. The standby mode may be divided into an idle mode, during which the terminal operates in response to a user input, and a sleep mode, during which the terminal sleeps to reduce power consumption if the terminal is not used for a desired amount of time. Power consumption may also be reduced by disconnecting a voltage supplied to certain portions of the terminal depending on the operating mode. However, since the terminal is turned on during both the traffic mode and the standby mode, a clock signal of the same high frequency should be applied during both the traffic mode and the standby mode. Power consumption may increase to higher than required levels when a processor of the terminal operates at a relatively high frequency regardless of the operating status of the processor.

SUMMARY

According to example embodiments, a method of power management includes detecting a workload rate of a processor; increasing a power level of the processor based on a first value, the first value being an average of the detected workload rate over an up reference time; and decreasing the power level of the processor based on a second value, the second value being an average of the detected workload rate over a down reference time, the down reference time being longer than the up reference time.

According to example embodiments, at least one of increasing the power level of the processor and decreasing the power level of the processor includes adjusting a frequency of a clock signal supplied to the processor.

According to example embodiments, the at least one of increasing the power level of the processor and decreasing the power level of the processor further includes adjusting a supply voltage of the processor.

According to example embodiments, the method of power management further includes decreasing the power level of the processor based on a third value, the third value being an average of the detected workload rate over a static reference time, the static reference time being longer than the down reference time.

According to example embodiments, the method of power management further includes decreasing the power level of the processor based on the second value when the second value is smaller than a down reference value; and decreasing a power level of the processor based on the third value when the third value is smaller than a static reference value. The static reference value is greater than the down reference value.

According to example embodiments, the method of power management further includes suspending an operation of the processor until the increased power level or the decreased power level is stabilized.

According to example embodiments, detecting the workload rate of the processor includes generating a plurality of unit workload rates of the processor consecutively by detecting the workload rate of the processor at intervals of a unit reference time.

According to example embodiments, increasing the power level of the processor based on the first value includes calculating the first value by averaging m unit workload rates among the plurality of unit workload rates, m being a positive integer; and increasing the power level of the processor when the first value is greater than an up reference value.

According to example embodiments, decreasing the power level of the processor based on the second value includes calculating the second value by averaging n unit workload rates among the plurality of unit workload rates, n being a positive integer greater than m; and decreasing the power level of the processor when the second value is smaller than a down reference value.

According to example embodiments, the method of power management further includes calculating the third value by averaging k unit workload rates, k being a positive integer greater than n; and decreasing the power level of the processor when the third value is smaller than a static reference value. The static reference value is greater than the down reference value.

According to example embodiments, the method of power management further includes calculating the first value and the second value by averaging a plurality of weighted unit workload rates, each of the plurality of weighted unit workload rates being generated by multiplying each unit workload rate by a respective weight value.

According to example embodiments, the method of power management further includes multiplying a first unit workload rate of the plurality of unit workload rates by a first weight value; and multiplying a second unit workload rate of the plurality of unit workload rates by a second weight value. The first weight value is larger than the second weight value if the first unit workload rate indicates a recent workload rate of the processor than the second unit workload rate.

According to example embodiments, the method of power management further includes decreasing the power level of the processor based on a third value, the third value being an average of the plurality of weighted unit workload rates over a static reference time, the static reference time being longer than the down reference time.

According to example embodiments, the method of power management further includes increasing the power level of the processor to a maximum power level when a desired event occurs, the desired event including an external input.

According to example embodiments, a power management apparatus includes a processor; a workload detector configured to monitor an operation of the processor and detect a workload rate of the processor; a power management unit configured to receive the detected workload rate of the processor and generate a level control signal indicating a power level of the processor; a voltage control unit configured to provide the processor with a supply voltage corresponding to the level control signal; and a clock control unit configured to provide the processor with a clock signal having a frequency corresponding to the level control signal.

According to example embodiments, the workload detector detects the workload rate of the processor at intervals of a unit reference time and successively generates a plurality of unit workload rates, and the power management unit controls the level control signal to increase the power level of the processor based on a first value indicating an average of the workload rates over an up reference time and to decrease the power level of the processor based on a second value indicating an average of the workload rates over an down reference time.

According to example embodiments, the power management unit includes a calculation unit configured to receive the workload rates from the workload detector and generate a comparison signal indicating the increase or decrease of the power level of the processor.

According to example embodiments, the calculation unit includes a history unit including a plurality of delay units, each delay unit configured to store a unit workload rate received from a previous delay unit and output the stored unit workload rate to a next delay unit after a desired time; an amplification unit including a plurality of amplifiers, each of the plurality of amplifiers configured to output an amplified corresponding unit workload rate received from the history buffer; a summing unit including a plurality of adders, each adder configured to sum an output of corresponding amplifiers, the corresponding amplifiers including each amplifier outputting an amplified unit workload rate to the adder; and a division unit including a plurality of dividers, each divider configured to divide an output of a given adder by a corresponding sum of gains of corresponding amplifiers, the corresponding amplifiers including each amplifier outputting an amplified unit workload rate to the given adder.

BRIEF DESCRIPTION OF THE DRAWINGS

The above and other features and advantages will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION OF EXAMPLE EMBODIMENTS

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1:
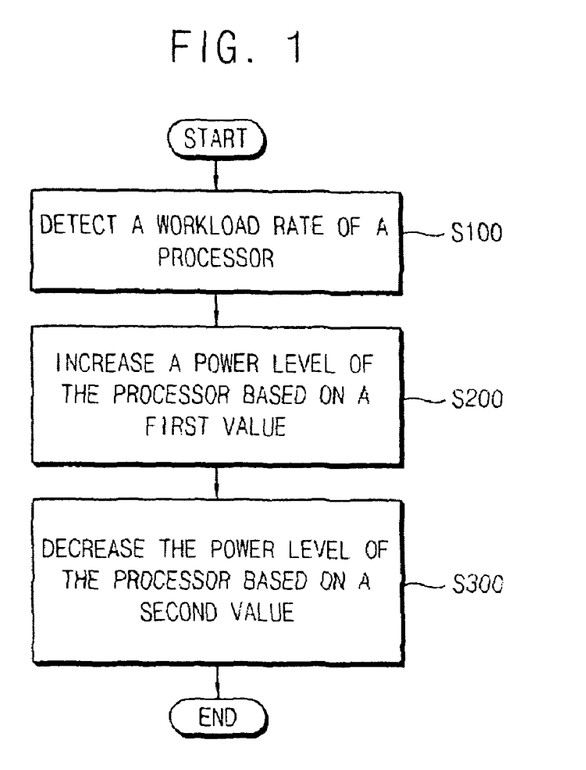
FIG. 1 is a flow chart illustrating a method of power management according to example embodiments.

FIG. 1 is a flow chart illustrating a method of power management according to example embodiments.

Referring to FIG. 1, a workload rate of a process is detected (step S100). A power level of the processor is increased based on a first value that is an average of the detected workload rate over an up reference time (step S200). The power level of the processor is decreased based on a second value that is an average of the detected workload rate over a down reference time (step S300), where the down reference time is longer than the up reference time.

The workload rate of the processor may be defined as a ratio of a real workload that is currently performed by the processor to a maximum workload that may be performed by the processor. An idle rate of the processor may be defined as a ratio of a possible workload that may be performed by the processor, in addition to the real workload, to the maximum workload that may be performed by the processor. Therefore, a sum of the workload rate and the idle rate equals one. The workload rate may be detected non-periodically whenever required or may be detected periodically at desired intervals of a time.

The power level of the processor may represent a degree of a power consumption of the processor. That is, when the processor performs a same work or a same application, the power consumption of the processor may increase as the power level of the processor increases. An operating speed of the processor may be increased as the power level of the processor increases. In some example embodiments, increasing the power level of the processor (step S200) and decreasing the power level of the processor (step S300) may include adjusting a frequency of a clock signal that is provided to the processor. For example, the frequency of the clock signal may be increased as the power level of the processor increases. Generally, in a digital logic circuit such as a processor, power is consumed when a signal is switched, that is, when a logic state of the signal, such as a clock signal, transitions from a logic high level to a logic low level or from the logic low level to the logic high level. As a result, as the frequency of the clock signal increases, the power consumption of the processor increases. Therefore, when a clock signal of a relatively high frequency and/or higher than required supply voltage (compared to the workload rate of the processor) is supplied to the processor, the power consumption of the processor may increase to higher than normal levels.

In example embodiments, increasing the power level of the processor (step S200) and decreasing the power level of the processor (step S300) may further include adjusting a supply voltage that is provided to the processor, as well as adjusting the frequency of the clock signal provided to the processor. As the frequency of the clock signal increases, the processor requires higher supply voltage for a high speed of switching elements such as transistors. Therefore, the supply voltage provided to the processor may be increased as the frequency of the clock signal increases. Generally, the power consumption increases as the supply voltage increases.

When the supply voltage and the frequency of the clock signal are changed, a certain amount of time is required for the supply voltage and the frequency of the clock signal to stabilize, for example, by a voltage regulator and a phase locked loop (PLL). Since the processor may operate incorrectly when the supply voltage and the frequency of the clock signal are not stable, an operation of the processor may be suspended until the increased power level and/or the decreased power level is stabilized, according to example embodiments.

The method of power management according to example embodiments may be performed using a dynamic voltage & frequency scaling (DVFS) method. In the DVFS method, a voltage and/or a frequency is dynamically changed according to an operating status of the processor. In a conventional DVFS method, power is managed based on a detected workload rate or a detected idle rate. However, the method of power management according to example embodiments adopts a hysteresis scheme and/or a time-weight scheme. That is, the power level of the processor may be increased based on the first value that is an average of the detected workload rate over a relatively short up reference time, and the power level of the processor may be decreased based on the second value that is an average of the detected workload rate over a relatively long down reference time. Hereinafter, the hysteresis scheme and the time-weight scheme is described with reference to FIGS. 2 and 3.

Figure 2:
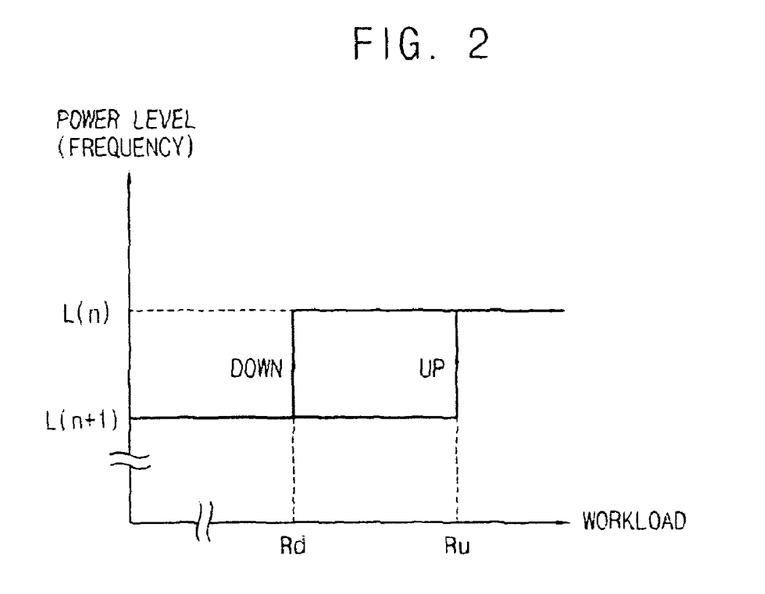
FIG. 2 illustrates a hysteresis scheme used in a method of power management according to example embodiments.

FIG. 2 illustrates a hysteresis scheme applied to a method of power management according to example embodiments.

An increase of the power level from a relatively low power level L(n+1) to a relatively high power level L(n) may be performed when the workload rate of the processor becomes greater than an up reference value Ru. When the frequency of the processor is relatively low compared to a workload of the processor, incorrect operation and performance degradation may be prevented by increasing the power level, and, therefore, increasing the frequency of the clock signal.

The power level may be decreased from a relatively high power level L(n) to a relatively low power level L(n+1) when the workload rate of the processor becomes smaller than a down reference value Rd. When the frequency of the processor is higher than required compared to a workload of the processor, the power consumption of the processor may be reduced by decreasing the power level, and, therefore, decreasing the frequency of the clock signal.

As illustrated in FIG. 2, in the hysteresis scheme, the down reference value Rd, which is a reference value in decreasing the power level, is set to be smaller than the up reference value Ru, which is a reference value in increasing the power level. As a difference between the up reference value Ru and the down reference value Rd increases, the power level may be maintained relatively longer without a change. As the difference between the up reference value Ru and the down reference value Rd decreases, the power level may be changed more frequently. That is, as the difference between the up reference value Ru and the down reference value Rd increases, a stability of an operation of the processor may be increased but power consumption may be increased. In contrast, as the difference between the up reference value Ru and the down reference value Rd decreases, the performance of the processor may be relatively poor because of a frequent change of the power level. Therefore, the up reference value Ru and the down reference value Rd may be determined based on a characteristic of the processor and power consumption.

Figure 3:
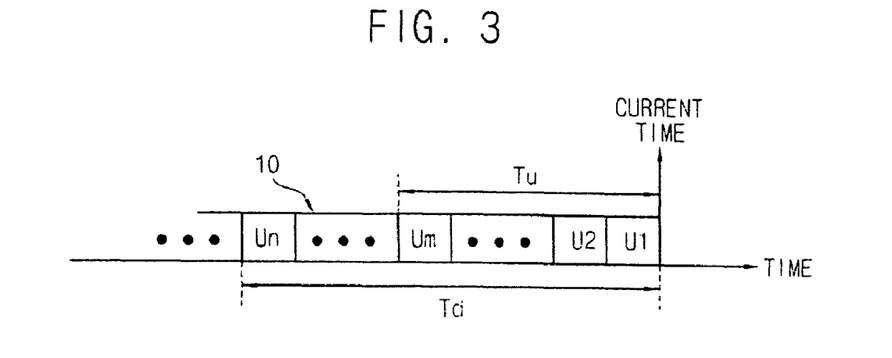
FIG. 3 illustrates a time-weight scheme used in a method of power management according to example embodiments.

FIG. 3 illustrates a time-weight scheme applied to a method of power management according to example embodiments.

As illustrated in FIG. 3, a current operating status of the processor to determine an increase of the power level is obtained from the first value A1 that is an average of the workload rate over the up reference time Tu, and a current operating status of the processor to determine a decrease of the power level is obtained from the second value A2 that is an average of the workload rate over the down reference time Td, which is longer than the up reference time Tu. As described above with reference to FIG. 2, when the first value A1 becomes greater than the up reference value Ru, the power level may be increased, and when the second value A2 becomes smaller than the down reference value Rd, the power level may be decreased. The down reference time Td may be set to be greater than the up reference time Tu to better control a condition of decreasing the power level compared with a condition of increasing the power level. Therefore, although the workload rate of the processor decreases temporarily during a short period, the processor may operate stably without a change of the power level due to increased time weight values in determining a decrease of the power level.

According to example embodiments of FIG. 3, the workload rate is detected at intervals of a unit reference time, and a plurality of unit workload rates Ui (i=1, 2, 3, . . . ) are generated consecutively. The generated unit workload rates Ui may be stored in a history buffer 10 consecutively. The history buffer 10 may be any storage means such as a register and/or a desired space of a memory corresponding to a desired address. The first value A1 may be calculated by averaging m unit workload rates (U1+U2+ . . . +Um)/m, and the second value A2 may be calculated by averaging n unit workload rates (U1+U2+ . . . +Un)/n, where n is greater than m.

In this way, the power consumption may be reduced and the performance of the processor and a system including the processor may be maintained stably together by using the hysteresis scheme and the time-weight scheme. The time-weight scheme applies large time weight values in determining a decrease of the power level compared with time weight values in determining an increase of the power level.

Figure 4:
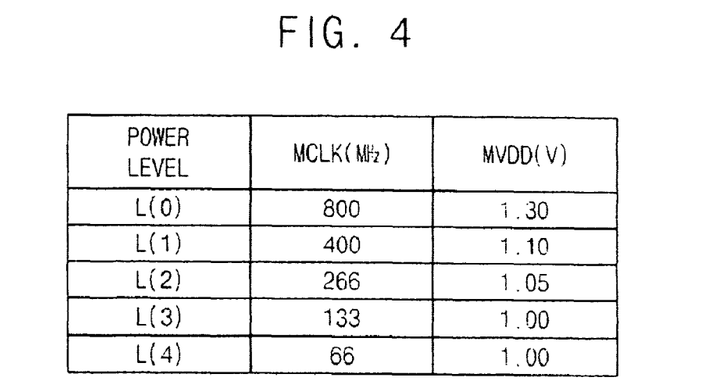
FIG. 4 illustrates example power levels used in a method of power management according to example embodiments.

FIG. 4 illustrates power levels used in a method of power management according to example embodiments.

In FIG. 4, the frequency of the clock signal MCLK and the supply voltage MVDD corresponding to each of the power levels L(0) to L(4) are illustrated. As illustrated in FIG. 4, the power level may include more than two levels, and the method of power management described above with reference to FIGS. 1 to 3 may be performed by increasing or decreasing the power level step by step.

Figure 5:
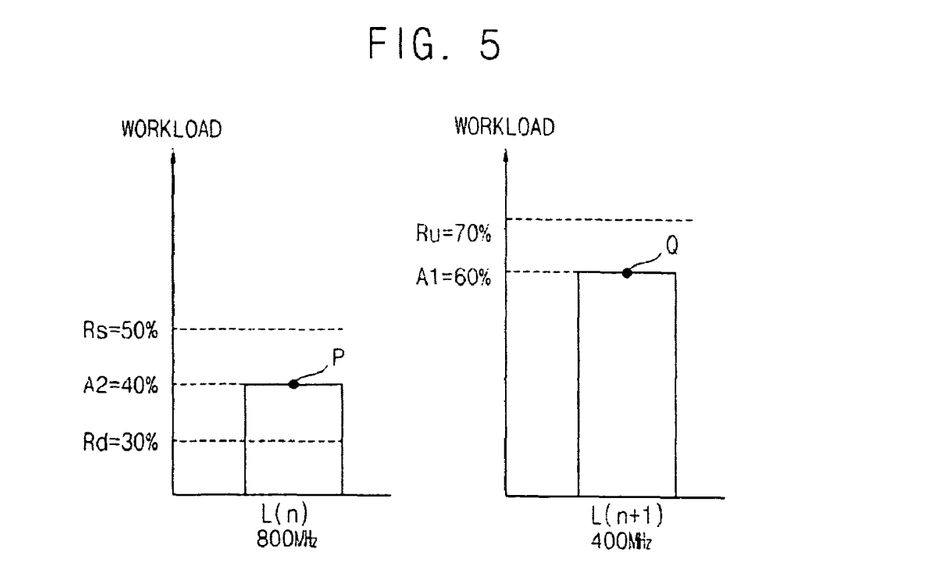
FIG. 5 illustrates operating statuses of a processor while performing a same application under different power levels.

FIG. 5 illustrates operating statuses of a processor while performing a same application under different power levels.

As illustrated in FIG. 5, in the case where the processor performs a same application, when the processor is in a status P in which the processor operates at a relatively higher power level (operating frequency 800 MHz), the second value A2 determines a decrease of the power level is 40%, and when the processor is in a status Q in which the processor operates at a relatively low power level (operating frequency 400 MHz), the first value A1 determines an increase of the power level is 60%. If the down reference value Rd, which determines a decrease of the power level, is, for example, 30%, the power level may remain unchanged at the level corresponding to 800 MHz since the second value A2 is greater than the down reference value Rd. If the up reference value Ru, which determines an increase of the power level, is, for example, 70%, the power level may remain unchanged at a level corresponding to 400 MHz since the first value A1 is smaller than the up reference value Ru. That is, the power level may be maintained in a relatively high level (operating frequency 800 MHz) or in a relatively low level (operating frequency 400 MHz) according to a previous power level of the processor. Therefore, when the processor is in a static operation state in which the workload rate of the processor remains substantially constant for a relatively long time, the processor may be maintained in different power levels according to a history of changes of the power level. In this case, it is beneficial that the processor is maintained in a relatively low power level to reduce the power consumption.

Hereinafter, the method of power management, according to example embodiments, which maintains the processor in a relatively low power level to reduce the power consumption when the processor is in the static operation state (workload rate of the processor remains substantially the same for a relatively long time) will be described.

Figure 6:
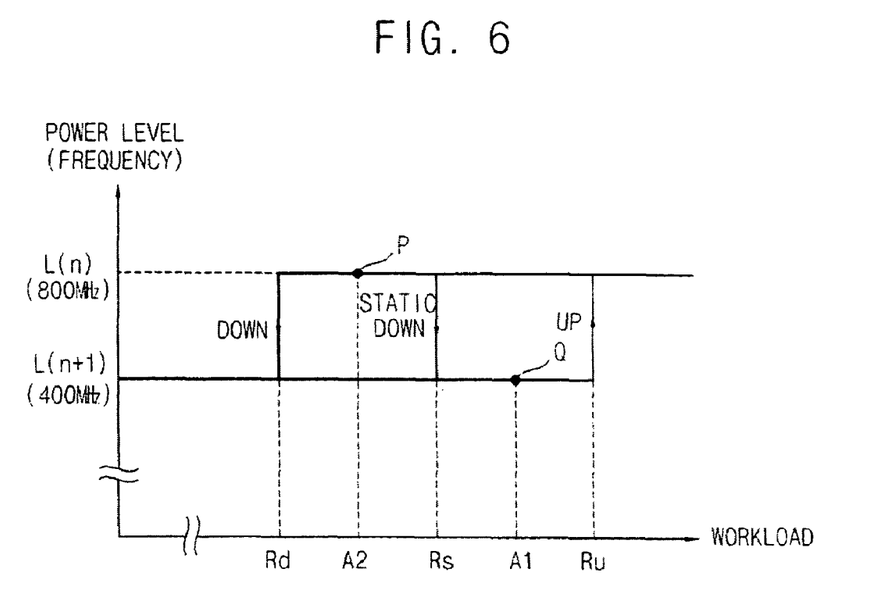
FIG. 6 illustrates a hysteresis scheme used in a method of power management according to example embodiments.

FIG. 6 illustrates a hysteresis scheme applied to a method of power management according to example embodiments.

As described above with reference to FIG. 2, an increase of the power level from a relatively low power level L(n+1) to a relatively high power level L(n) may be performed when the workload rate of the processor becomes greater than the up reference value Ru. When the frequency of the processor is relatively low compared to a workload of the processor, incorrect operation and/or poor performance may be prevented by increasing the power level, and, therefore, increasing the frequency of the clock signal.

On the contrary, a decrease of the power level from a relatively high power level L(n) to a relatively low power level L(n+1) may be performed when the workload rate of the processor becomes smaller than the down reference value Rd. When the frequency of the processor is higher than required as compared to a workload of the processor, the power consumption of the processor may be reduced by decreasing the power level, and, therefore, decreasing the frequency of the clock signal.

As described above, in the hysteresis scheme, as a difference between the up reference value Ru and the down reference value Rd increases, the power level may be maintained relatively longer without a change, and as the difference between the up reference value Ru and the down reference value Rd decreases, the power level may be changed frequently. As the difference between the up reference value Ru and the down reference value Rd increases, power consumption may be increased. In contrast, as the difference between the up reference value Ru and the down reference value Rd decreases, the performance of the processor may be relatively poor because of a frequent change of the power level.

In the case where the processor performs a same application, the status P of the processor in which the processor operates in a relatively high power level L(n) and the status Q of the processor in which the processor operates in a relatively low power level L(n+1) (FIG. 5) is illustrated in FIG. 6. Referring to FIG. 6, when the processor remains in the status P, the power level may be unchanged at L(n) since the second value A2 corresponding to the status P is greater than the down reference value Rd. However, when the processor remains in the status P for a relatively long time, it is beneficial that the status of the processor be changed to the status Q by decreasing STATIC DOWN the power level to reduce the power consumption.

Figure 7:
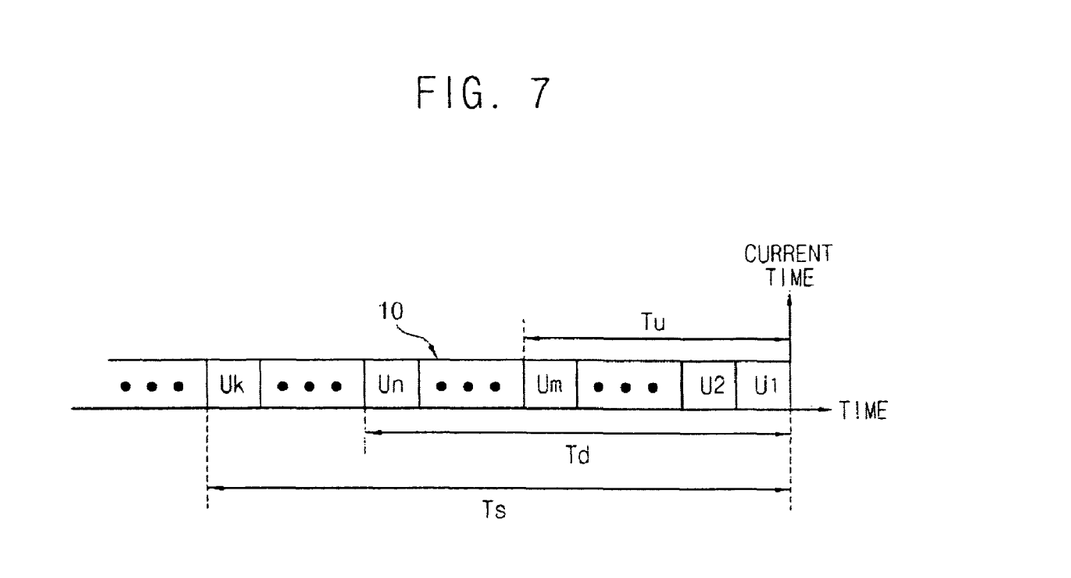
FIG. 7 illustrates a time-weight scheme used in a method of power management according to example embodiments.

FIG. 7 illustrates a time-weight scheme applied to a method of power management according to example embodiments.

As illustrated in FIG. 7, a current operating status of the processor to determine an increase of the power level is obtained from a first value A1 that is an average of the workload rate over the up reference time Tu, and a current operating status of the processor to determine a decrease of the power level is obtained from a second value A2 that is an average of the workload rate over the down reference time Td, which is longer than the up reference time Tu. As described above with reference to FIGS. 1, 2 and 3, when the first value A1 becomes greater than the up reference value Ru, the power level may be increased, and when the second value A2 becomes smaller than the down reference value Rd, the power level may be decreased.

The method of power management according to example embodiments of FIGS. 6 and 7 may further include decreasing STATIC DOWN the power level based on a third value A3 that is an average of the workload rate over a static reference time Ts, which is longer than the down reference time Td. When the third value A3 becomes smaller than a static reference value Rs, the power level may be decreased. The static reference value Rs may be set to be greater than the down reference value Rd.

Referring to FIG. 6, when the processor remains in the status P (a relatively high power level L(n)) for a relatively long time, the second value A2 and the third value A3 are substantially the same. In this case, according to a dynamic criterion that uses the first value A1 and the second value A2, the power level is not decreased since the second value A2 is greater than the down reference value Rd. However, according to a static criterion that uses the third value A3, the power level is decreased since the third value A3 is smaller than the static reference value Rs. Therefore, according to the static criterion, the power level may be decreased, and the power consumption may be reduced by operating the processor in the status Q (in a relatively low power level (L(n+1)).

According to example embodiments of FIG. 7, the workload rate is detected at intervals of a unit reference time, and a plurality of unit workload rates Ui (i=1, 2, 3, . . . ) are generated consecutively. The generated unit workload rates Ui may be stored in a history buffer 10 consecutively. The history buffer 10 may be any storage means such as a register and/or a desired space of a memory corresponding to a desired address. The first value A1 may be calculated by averaging m unit workload rates (U1+U2+ . . . +Um)/m, the second value A2 may be calculated by averaging n unit workload rates (U1+U2+ . . . +Un)/n, and the third value A3 may be calculated by averaging k unit workload rates (U1+U2+ . . . +Uk)/k, where n is greater than m, and k is greater than n.

In this way, the power consumption may be further reduced and the performance of the processor and a system including the processor may be maintained stably together by decreasing the power level using the static criterion when the processor is in the static operation state in which the workload rate of the processor remains substantially the same for a relatively long time, as well as by using the hysteresis scheme and the time-weight scheme that applies large time weight values to determine a decrease of the power level compared with time weight value to determine an increase of the power level.

Figure 8:
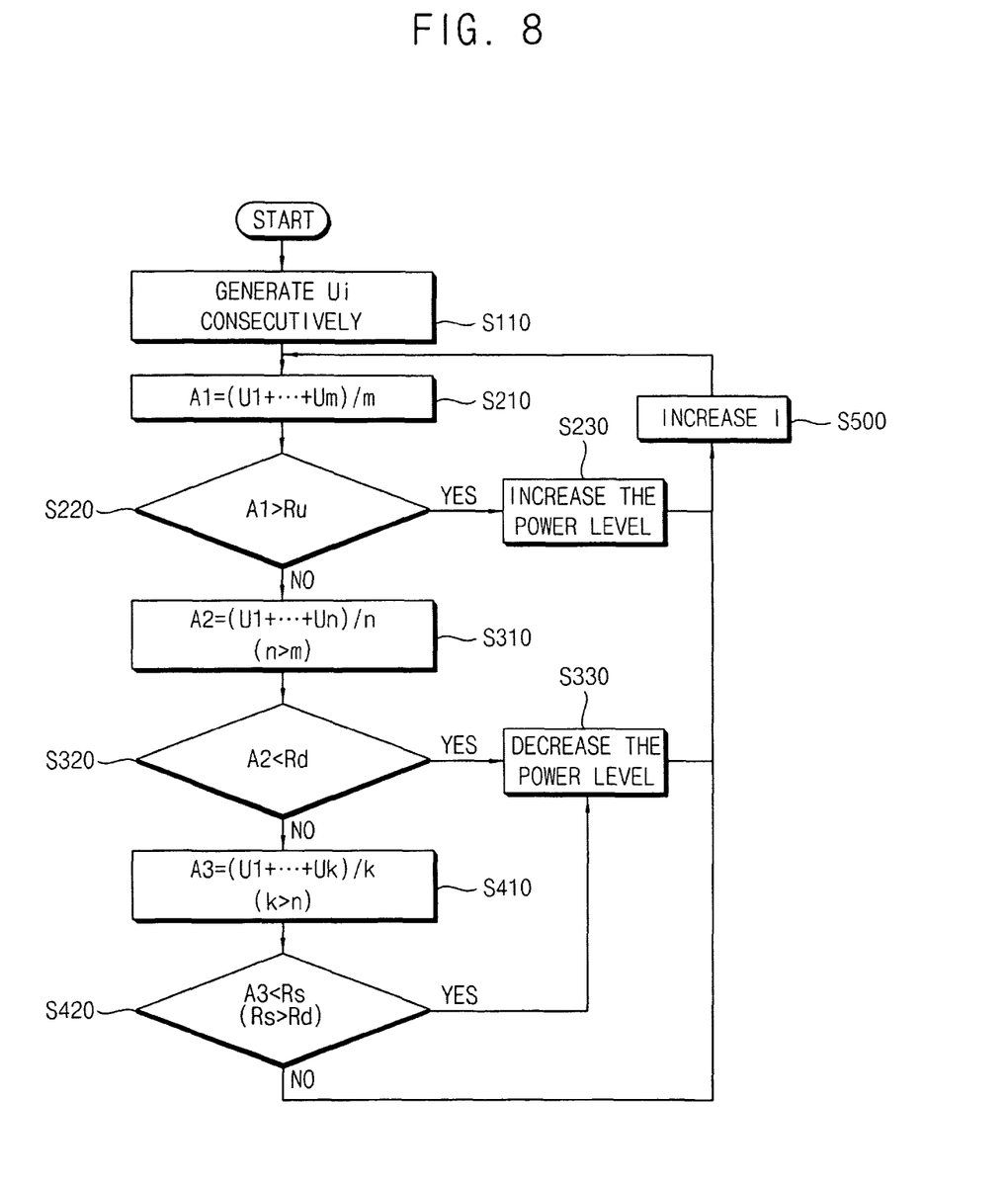
FIG. 8 is a flow chart illustrating a method of power management according to example embodiments.

FIG. 8 is a flow chart illustrating a method of power management according to example embodiments.

Referring to FIG. 8, the workload rate is detected at intervals of a unit reference time, and a plurality of unit workload rates Ui (i=1, 2, 3 . . . ) are generated consecutively (step S110). Increasing the power level of the processor based on the first value A1 (step S200) of FIG. 1 may include calculating the first value A1 by averaging m unit workload rates U1, U2, . . . , Um (step S210), determining whether the first value A1 is greater than the up reference value Ru (step S220), and increasing the power level of the processor when the first value A1 is greater than the up reference value Ru (step S230). Similarly, decreasing the power level of the processor based on the second value A2 (step S300) of FIG. 1 may include calculating the second value A2 by averaging n unit workload rates U1, U2, . . . , Un (step S310), where n is greater than m, determining whether the second value A2 is smaller than the down reference value Rd (step S320), and decreasing the power level of the processor when the second value A2 is smaller than the down reference value Rd (step S330).

As described above with reference to FIGS. 5, 6 and 7, the method of power management according to example embodiments may further include calculating the third value A3 by averaging k unit workload rates U1, U2, . . . , Uk (step S410), where k is greater than n, determining whether the third value A3 is smaller than the static reference value Rs (step S420), where the static reference value Rs is greater than the down reference value Rd, and decreasing the power level of the processor when the third value A3 is smaller than the static reference value Rs (step S330).

The steps S210, S220, S230, S310, S320, S330, S410 and S420 may be repeated after an increase of i (step S500). The increase of i represents that a previous value of Uj becomes Uj+1 (j is a positive integer), such that a newly generated unit workload rate becomes U1 and a previous value of U1 becomes U2. For example, as is described below with reference to FIG. 13, the increase of i may be performed using a shift register receiving the unit workload rates consecutively. In example embodiments, the most recent unit workload rate may be generated at intervals of a unit reference time, and the steps S210, S220, S230, S310, S320, S330, S410 and S420 may be repeated at intervals of the unit reference time.

In example embodiments, although not illustrated in FIG. 8, the power level of the processor may be increased to a maximum power level when a desired event, such as a user input occurs. That is, when a user input from input devices, such as keyboards and touch pads, is detected, for example, by an event handler, the power level of the processor may be increased to a maximum power level to improve a performance of the device having the processor.

Figure 9:
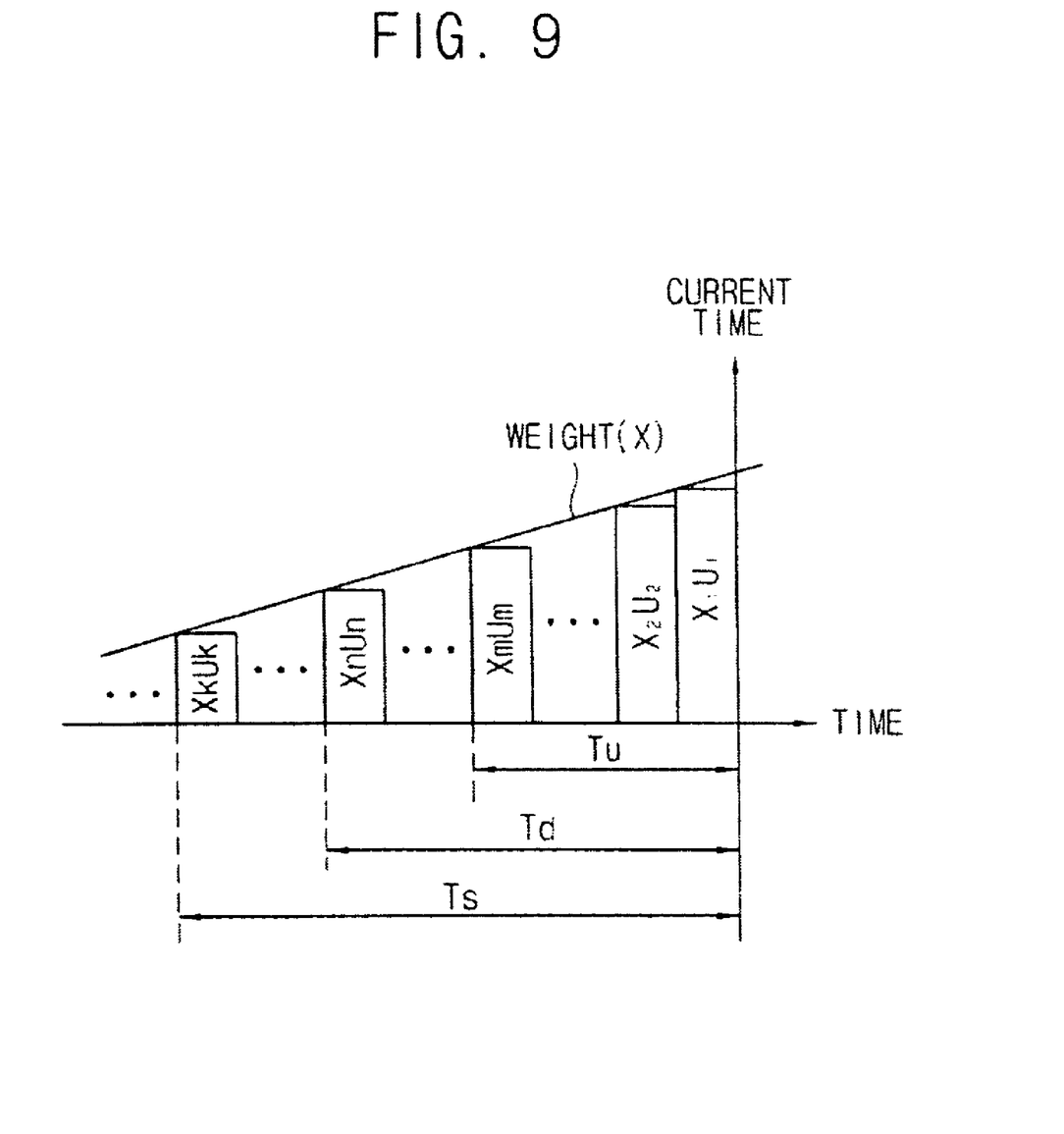
FIG. 9 illustrates a time-weight scheme used in a method of power management according to example embodiments.

FIG. 9 illustrates a time-weight scheme applied to a method of power management according to example embodiments.

As illustrated in FIG. 9, a current operating status of the processor for determining an increase of the power level is obtained from the first value A1 that is an average of the workload rate over the up reference time Tu, and a current operating status of the processor for determining a decrease of the power level is obtained from the second value A2 that is an average of the workload rate over the down reference time Td, which is longer than the up reference time Tu. As described above with reference to FIGS. 1, 2 and 3, when the first value A1 becomes greater than the up reference value Ru, the power level may be increased, and when the second value A2 becomes smaller than the down reference value Rd, the power level may be decreased.

As described above with reference to FIGS. 6 and 7, the method of power management according to example embodiments of FIG. 9 may further include decreasing STATIC DOWN the power level based on the third value A3 that is an average of the workload rate over the static reference time Ts, which is longer than the down reference time Td. When the third value A3 is smaller than the static reference value Rs, the power level may be decreased. The static reference value Rs may be set to be greater than the down reference value Rd.

As described above with reference to FIG. 6, when the processor remains in the status P (i.e., in a relatively high power level L(n)) for a relatively long time, the second value A2 and the third value A3 are substantially the same. In this case, according to the dynamic criterion that uses the first value A1 and the second value A2, the power level not decreased since the second value A2 is greater than the down reference value Rd. However, according to the static criterion that uses the third value A3, the power level is decreased since the third value A3 is smaller than the static reference value Rs. Therefore, according to the static criterion, the power level may be decreased, and the power consumption may be reduced by operating the processor in the status Q (a relatively low power level (L(n+1)).

According to example embodiments of FIG. 9, the workload rate is detected at intervals of a unit reference time, and a plurality of unit workload rates Ui (i=1, 2, 3, . . . ) are generated consecutively. The generated unit workload rates Ui may be stored in a history buffer 10 consecutively. The history buffer 10 may be any storage means such as a register and/or a desired space of a memory corresponding to a desired address.

In example embodiments of FIG. 7, the first value A1, the second value A2 and the third value A3 are calculated by averaging unit workload rates Ui. However, in example embodiments of FIG. 9, each of the unit workload rates Ui is multiplied by a respective weight value Xi (i=1, 2, 3, . . . ) to generate weighted unit workload rates XiUi (i=1, 2, 3, . . . ), and the first value A1, the second value A2 and the third value A3 are calculated by averaging the weighted unit workload rates XiUi. For example, the recent a generated a unit workload rate is, the larger weight value may be multiplied to the unit workload rate. For example, the weight values Xi may be set as Xi>Xi+1. The current operating status of the processor may be determined more accurately by multiplying larger weight value to more recently generated unit workload rate.

In example embodiments of FIG. 9, the first value A1 may be calculated by averaging m weighted unit workload rates (X1U1+X2U2+ . . . +XmUm)/(X1+X2+ . . . +Xm), the second value A2 may be calculated by averaging n weighted unit workload rates (X1U1+X2U2+ . . . +XnUn)/(X1+X2+ . . . +Xn), and the third value A3 may be calculated by averaging k weighted unit workload rates (X1U1+X2U2+ . . . +XkUk)/(X1+X2+ . . . +Xk), where n is greater than m, and k is greater than n.

In this way, the power consumption may be further reduced and the performance of the processor and a system including the processor may be maintained stably together by multiplying larger weight value to more recently generated unit workload rate, as well as by using the hysteresis schema and the time-weight scheme. The time-weight scheme applies large time weight values in determining a decrease of the power level compared with time weight value in determining an increase of the power level and by decreasing the power level using the static criterion when the processor is in the static operation state in which the workload rate of the processor remains substantially the same for a relatively long time.

Figure 10:
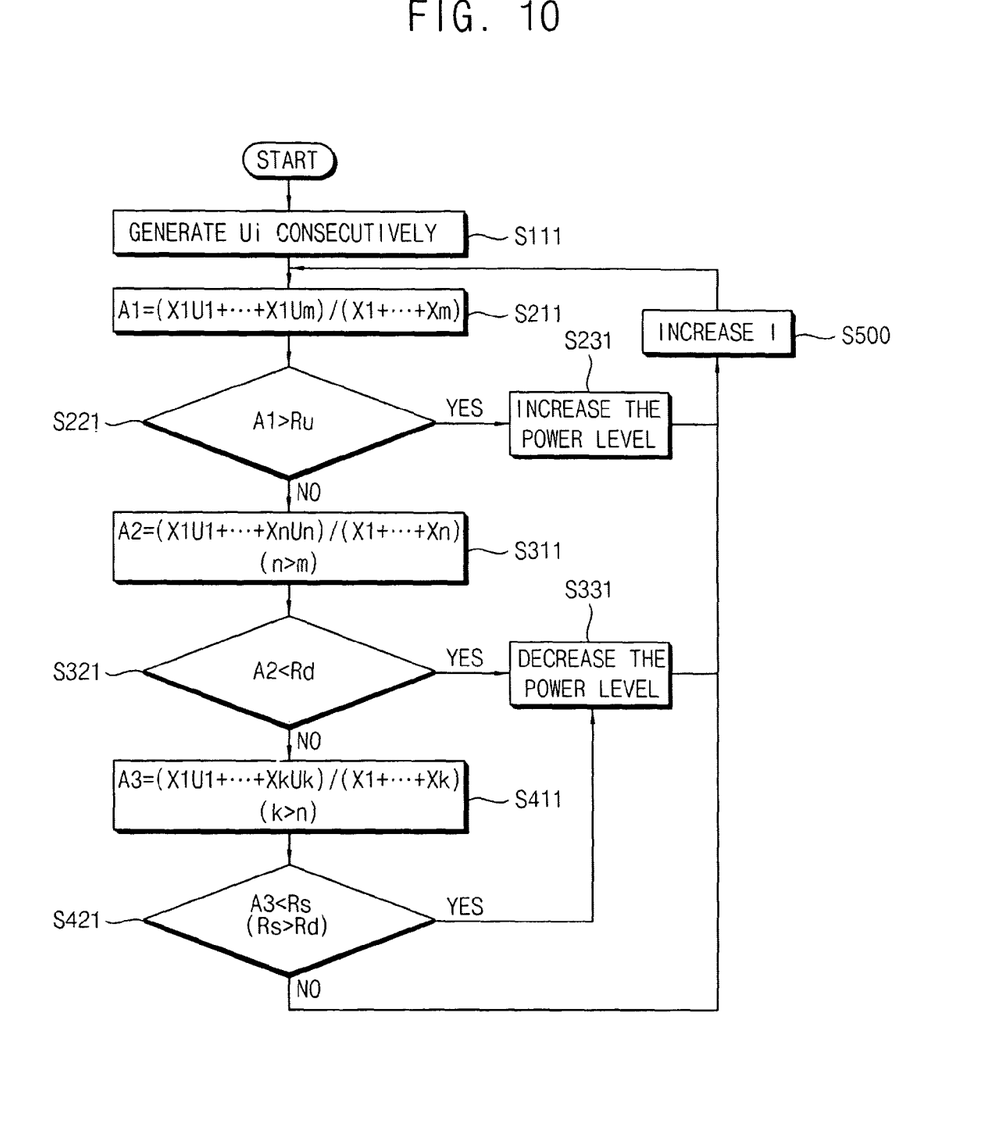
FIG. 10 is a flow chart illustrating a method of power management according to example embodiments.

FIG. 10 is a flow chart illustrating a method of power management according to example embodiments.

Referring to FIG. 10, the workload rate is detected at intervals of a unit reference time, and a plurality of unit workload rates Ui (i=1, 2, 3, . . . ) are generated consecutively (step S111). Increasing the power level of the processor based on the first value A1 (step S200) of FIG. 1 may include calculating the first value A1 by averaging m weighted unit workload rates X1U1, X2U2, . . . , XmUm (step S211), determining whether the first value A1 is greater than the up reference value Ru (step S221), and increasing the power level of the processor when the first value A1 is greater than the up reference value Ru (step S231). Similarly, decreasing the power level of the processor based on the second value A2 (step S300) of FIG. 1 may include calculating the second value A2 by averaging n weighted unit workload rates X1U1, X2U2, . . . , XnUn (step S311), where n is greater than m, determining whether the second value A2 is smaller than the down reference value Rd (step S321), and decreasing the power level of the processor when the second value A2 is smaller than the down reference value Rd (step S331).

As described above with reference to FIGS. 5, 6 and 7, the method of power management according to example embodiments may further include calculating the third value A3 by averaging k weighted unit workload rates X1U1, X2U2, . . . , XkUk (step S411), where k is greater than n, determining whether the third value A3 is smaller than the static reference value Rs (step S421), where the static reference value Rs is greater than the down reference value Rd, and decreasing the power level of the processor when the third value A3 is smaller than the static reference value Rs (step S331).

Figure 11:
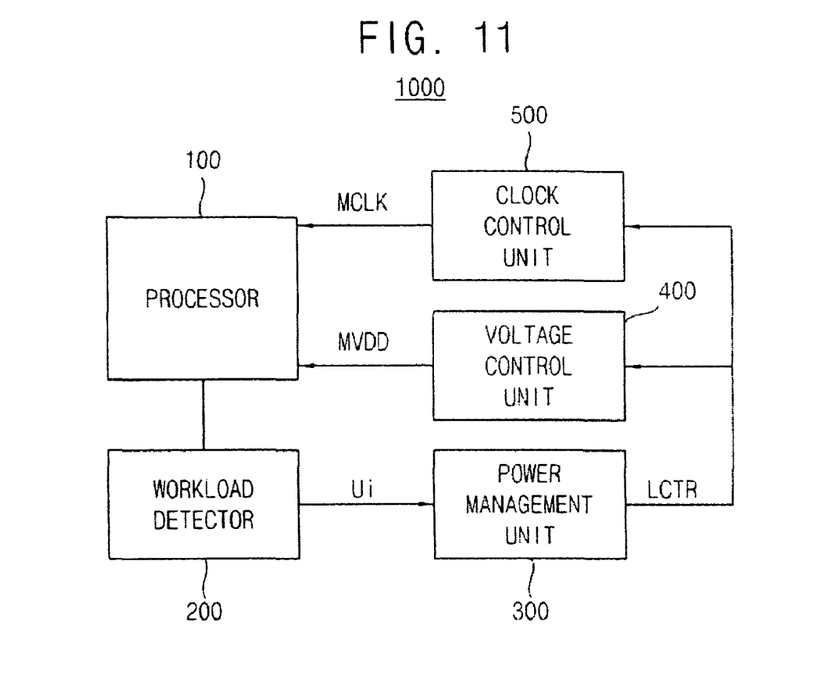
FIG. 11 is a block diagram illustrating an apparatus that performs power management according to example embodiments.

FIG. 11 is a block diagram illustrating an apparatus that performs power management according to example embodiments.

Referring to FIG. 11, an apparatus 1000 includes a processor 100, a workload detector 200, a power management unit 300, a voltage control unit 400 and a clock control unit 500. Although not illustrated in FIG. 11, the apparatus 1000 may include an input device such as a keyboard and a touch pad, output device such as a display and a speaker, a memory, an interface, a battery and/or a peripheral device.

The processor 100 may include a central processing unit CPU, a digital signal processor (DSP), a micro controller and/or a memory controller, and may be any processor that performs operations, such as a calculation, in response to a clock signal.

The workload detector 200 monitors an operation of the processor 100 and detects a workload rate of the processor 100. For example, the workload detector 200 may detect the workload rate of the processor 100 at intervals of a unit reference time and generate a plurality of unit workload rates Ui (i=1, 2, 3, . . . ) consecutively. The workload detector 200 may be embodied in a variety of obvious ways to detect and/or provide the workload rate or the idle rate of the processor 100.

The power management unit 300 receives the workload rates Ui from the workload detector 200 and generates a level control signal LCTR representing the power level of the processor 100. The power management unit 300 may control the level control signal LCTR to increase the power level of the processor 100 based on the first value A1, which is an average of the workload rate over the up reference time, and to decrease the power level of the processor 100 based on the second value A2, which is an average of the workload rate over the down reference time.

The power management unit 300 may be separate from other elements or at least a portion of the power management unit 300 may be integrated into other elements of the apparatus 1000. For example, the power management unit 300 may be a part of the processor 100 or may be embodied as hardware or software in the processor 100. When at least a portion of the power management unit 300 is embodied as software, the software may be stored in a memory as an executable code and a method of power management according to example embodiments may be performed by executing the stored code using the processor 100. When a program corresponding to the power management unit 300 is executed under a control of an operating system of the processor 100, the program corresponding to the power management unit 300 may be embodied as a subroutine called by the operating system.

The voltage control unit 400 provides the processor 100 with the supply voltage MVDD corresponding to the level control signal LCTR. The clock control unit 500 provides the processor 100 with a clock signal MCLK having a frequency corresponding to the level control signal LCTR.

Figure 12:
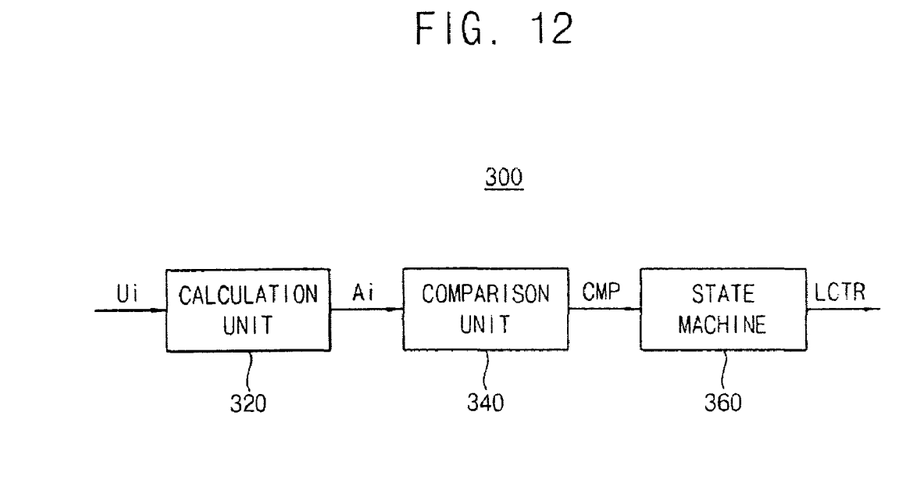
FIG. 12 is a block diagram illustrating a power management unit included in the apparatus of FIG. 11, according to example embodiments.

FIG. 12 is a block diagram illustrating an example of a power management unit included in the apparatus of FIG. 11, according to example embodiments.

Referring to FIG. 12, the power management unit 300 may include a calculation unit 320, a comparison unit 340 and a state machine 360.

The calculation unit 320 may receive the workload rates Ui from the workload detector 200, calculate the first value A1, the second value A2 and the third value A3 as described above, and output the first value A1, the second value A2 and the third value A3. The comparison unit 340 may compare the first value A1, the second value A2 and the third value A3 with the up reference value Ru, the down reference value Rd, and/or the static reference value Rs, respectively, and generate a comparison signal CMP representing an increase or a decrease of the power level. The comparison signal CMP may be stored in the state machine 360, and the state machine 360 may provide the voltage control unit 400 and the clock control unit 500 of FIG. 11 with the level control signal LCTR. The state machine 360 may be a register included in the processor 100 or an external register. In example embodiments, the state machine 360 may be omitted, and the comparison signal CMP may be directly provided to the voltage control unit 400 and the clock control unit 500 as the level control signal LCTR.

Figure 13:
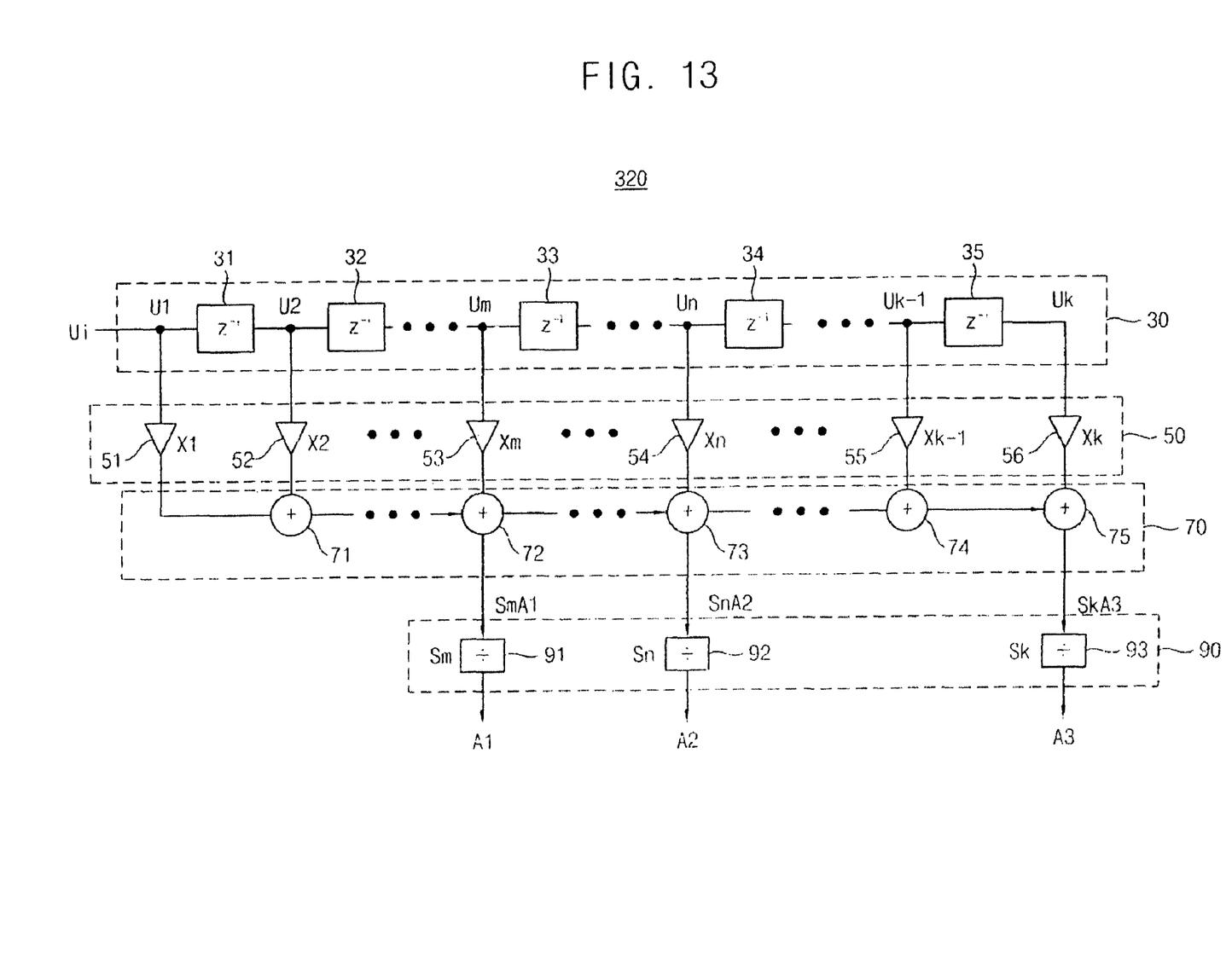
FIG. 13 is a circuit diagram illustrating of a calculation unit included in the power management unit of FIG. 12, according to example embodiments.

FIG. 13 is a circuit diagram illustrating an example of a calculation unit included in the power management unit of FIG. 12, according to example embodiments.

Referring to FIG. 13, the calculation unit 320 may include a history buffer 30, an amplification unit 50, a summing unit 70 and a division unit 90. The workload rates Ui may be the plurality of unit workload rates (U1, U2, . . . ) generated consecutively at intervals of a unit reference time.

As described above, the history buffer 30 may be any storage means such as a register and a desired space of a memory corresponding to a desired address. The history buffer 30 may include a plurality of delay units 31, 32, 33, 34 and 35 serially connected to each other. Each of the plurality of delay units 31, 32, 33, 34 and 35 may store the unit workload rate Uj received from a previous delay unit and output the stored unit workload rate Uj to a next delay unit as a unit workload rate Uj+1 after a desired time. For example, each of the plurality of delay units 31, 32, 33, 34 and 35 may include a latch, and, in this case, the history buffer 30 may operate as a shift register.

The amplification unit 50 may include a plurality of amplifiers 51, 52, 53, 54, 55 and 56. Each of the plurality of amplifiers 51, 52, 53, 54, 55 and 56 may amplify a corresponding unit workload rate. Gains of the plurality of amplifiers 51, 52, 53, 54, 55 and 56 may correspond to the weight values Xi described above with reference to FIG. 10.

When the apparatus of FIG. 11 performs the method of power management according to example embodiments of FIG. 10, the gains of the plurality of amplifiers 51, 52, 53, 54, 55 and 56 may differ from each other. For example, the gains of the plurality of amplifiers 51, 52, 53, 54, 55 and 56 may be set such that $X_i > X_{i+1}$ is satisfied to multiply larger weight value to the more recently generated unit workload rate. For example, the gains of the plurality of amplifiers 51, 52, 53, 54, 55 and 56 may be set such that a gain X1 of a first amplifier 51 is the largest and a gain Xk of a last amplifier 56 is the smallest.

The summing unit 70 may include a plurality of adders 71, 72, 73, 74 and 75. Each of the plurality of adders 71, 72, 73, 74 and 75 may sum an output of a previous adder and an output of a corresponding amplifier. As a result, each of the plurality of adders 71, 72, 73, 74 and 75 may sum outputs of all of the previous amplifiers. For example, an adder 72 receiving an output of m-th amplifier 53 may output $SmA1 = X_1U_1 + X_2U_2 + \ldots + X_mU_m$.

The division unit 90 may include a plurality of dividers 91, 92 and 93. Each of the plurality of dividers 91, 92 and 93 may divide an output of an adder by a corresponding sum of gains Sm, Sn and Sk. In FIG. 13, a first divider 91 generates the first value A1, which is an average of m weighted unit workload rates, by dividing an output SmA1 of an adder 72 by a sum of gains Sm, a second divider 92 generates the second value A2, which is an average of n weighted unit workload rates, by dividing an output SnA2 of an adder 73 by a sum of gains Sn, and a third divider 93 generates the third value A3, which is an average of k weighted unit workload rates, by dividing an output SkA3 of an adder 75 by a sum of gains Sk.

The up reference time Tu, the down reference time Td and the static reference time Ts described above may determined the connections between the plurality of adders and the dividers 91, 92 and 93. When the unit reference time, which is an interval a unit workload rate is generated, is t, the up reference time Tu may be equal to t*m, the down reference time Td may be equal to t*n, and the static reference time Ts may be equal to t*k.

When the apparatus of FIG. 11 performs the method of power management according to example embodiments of FIG. 8, the plurality of amplifiers 51, 52, 53, 54, 55 and 56 may be omitted or the gains of the plurality of amplifiers 51, 52, 53, 54, 55 and 56 may be set equal to each other so that the unit workload rates are averaged without any weights. Although, the history buffer 30, the amplification unit 50, the summing unit 70 and/or the dividing unit 90 have been described to include a finite number of respective elements (for example, delay units, amplifiers, adders and/or dividers), a number of these elements is not restricted thereto and the history buffer 30, the amplification unit 50, the summing unit 70 and/or the dividing unit 90 may included more or less than the respective number of elements described above.

Figure 14:
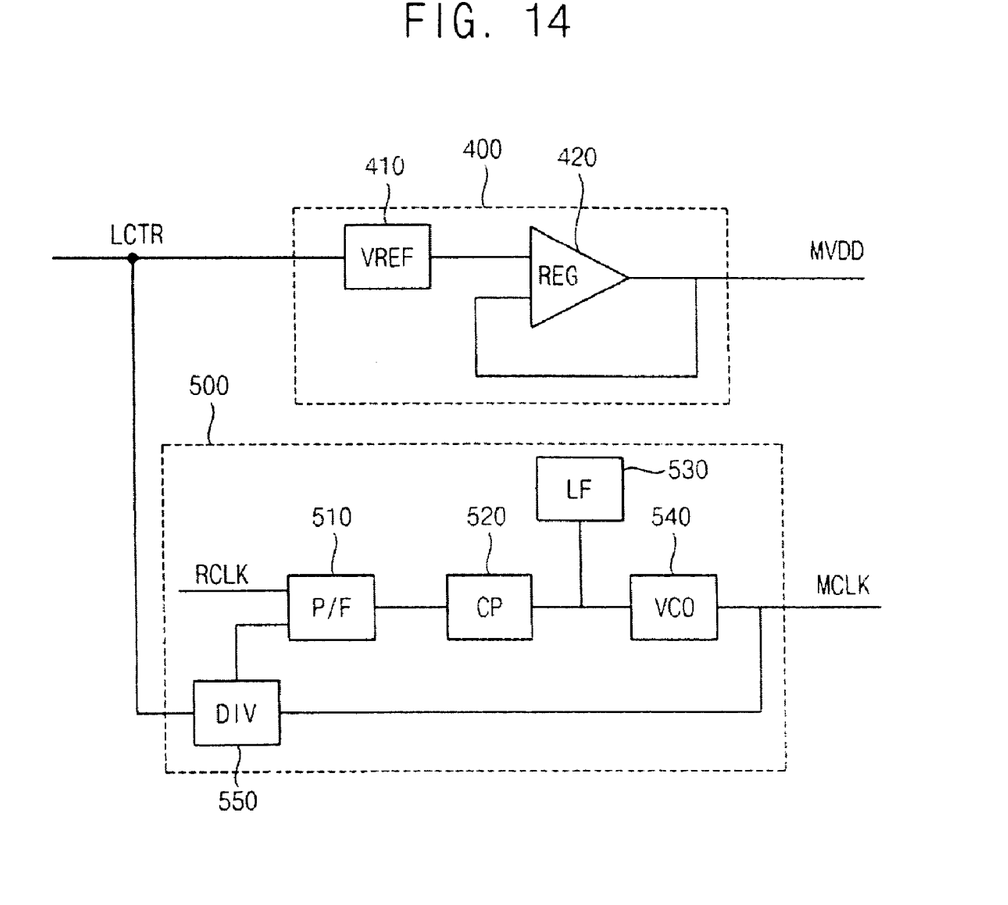
FIG. 14 illustrates the voltage control unit 400 and the clock control unit 500 of FIG. 11, according to example embodiments.

FIG. 14 illustrates the voltage control unit 400 and the clock control unit 500 of FIG. 11, according to example embodiments.

Referring to FIG. 14, the voltage control unit 400 may include a reference voltage generator VREF 410 and a regulator REG 420. The reference voltage generator 410 may receive the level control signal LCTR from the power management unit 300 and generate a reference voltage adjusted by the level control signal LCTR. The regulator 420 may provide the processor 100 with the supply voltage MVDD corresponding to the level control signal LCTR by comparing the reference voltage received from the reference voltage generator 410 with the supply voltage MVDD that is fed back from an output of the regulator 420.

As illustrated in FIG. 14, the clock control unit 500 may be embodied as a phase locked loop PLL, for example. A frequency divider DIV 550 may receive the level control signal LCTR from the power management unit 300 and generate a divided clock signal by dividing the clock signal MCLK in a division ratio corresponding to the level control signal LCTR. A phase and frequency detector P/F 510 may generate an up signal and a down signal by comparing the divided clock signal with a reference clock signal RCLK. A charge pump CP 520 may generate a control voltage based on the up signal and the down signal. A loop filter LF 530 may filter the control voltage. A voltage-controlled oscillator VCO 540 may provide the processor 100 with the clock signal MCLK in response to the filtered control voltage received from the loop filter 530.

In this way, the supply voltage MVDD and/or the frequency of the clock signal MCLK provided to the processor 100 may be adjusted by controlling the reference voltage output from the reference voltage generator 410 and/or the division ratio of the frequency divider 550 using the level control signal LCTR that represents the power level of the processor 100. However, this is only an example, and the supply voltage MVDD and/or the frequency of the clock signal MCLK provided to the processor 100 may be adjusted in a variety of different ways.

Example embodiments of the inventive concepts may be used in a device and a system including a processor operating based on a clock signal to reduce the power consumption and to operate the device and the system stably.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A method of power management, comprising:
   detecting a workload rate of a processor;
   increasing a power level of the processor based on a first value, the first value being an average of the detected workload rate over an up reference time;
   decreasing the power level of the processor based on a second value, the second value being an average of the detected workload rate over a down reference time, the down reference time being longer than the up reference time; and
   decreasing the power level of the processor based on a third value, the third value being an average of the detected workload rate over a static reference time, the static reference time being longer than the down reference time.

2. The method of claim 1, wherein at least one of increasing the power level of the processor and decreasing the power level of the processor based on the second value includes:
   adjusting a frequency of a clock signal supplied to the processor.

3. The method of claim 2, wherein the at least one of increasing the power level of the processor and decreasing the power level of the processor based on the second value further includes:
   adjusting a supply voltage of the processor.

4. The method of claim 1, further comprising:
   decreasing the power level of the processor based on the second value when the second value is smaller than a down reference value; and
   decreasing a power level of the processor based on the third value when the third value is smaller than a static reference value,
      wherein the static reference value is greater than the down reference value.

5. The method of claim 1, further comprising:
   suspending an operation of the processor until the increased power level or the decreased power level is stabilized.

6. The method of claim 1, wherein detecting the workload rate of the processor includes:
   generating a plurality of unit workload rates of the processor consecutively by detecting the workload rate of the processor at intervals of a unit reference time.

7. The method of claim 6, wherein increasing the power level of the processor based on the first value includes:
   calculating the first value by averaging m unit workload rates among the plurality of unit workload rates, m being a positive integer; and
   increasing the power level of the processor when the first value is greater than an up reference value, and
   wherein decreasing the power level of the processor based on the second value includes:
   calculating the second value by averaging n unit workload rates among the plurality of unit workload rates, n being a positive integer greater than m; and
   decreasing the power level of the processor when the second value is smaller than a down reference value.

8. The method of claim 7, further comprising:
   calculating the third value by averaging k unit workload rates, k being a positive integer greater than n; and
   decreasing the power level of the processor when the third value is smaller than a static reference value,
      wherein the static reference value is greater than the down reference value.

9. The method of claim 6, further comprising:
   calculating the first value and the second value by averaging a plurality of weighted unit workload rates, each of the plurality of weighted unit workload rates being generated by multiplying each unit workload rate by a respective weight value.

10. The method of claim 9, further comprising:
    multiplying a first unit workload rate of the plurality of unit workload rates by a first weight value; and
    multiplying a second unit workload rate of the plurality of unit workload rates by a second weight value,
       wherein the first weight value is larger than the second weight value if the first unit workload rate indicates a recent workload rate of the processor than the second unit workload rate.

11. The method of claim 9,
    wherein the third value is an average of the plurality of weighted unit workload rates over the static reference time.

12. The method of claim 1, further comprising:
    increasing the power level of the processor to a maximum power level when a desired event occurs, the desired event including an external input.

13. A power management apparatus comprising:
    a processor;
    a workload detector configured to monitor an operation of the processor and detect a workload rate of the processor;
    a power management unit configured to receive the detected workload rate of the processor and generate a level control signal indicating a power level of the processor;
    a voltage control unit configured to provide the processor with a supply voltage corresponding to the level control signal; and
    a clock control unit configured to provide the processor with a clock signal having a frequency corresponding to the level control signal,
    wherein the power management unit is configured to control the level control signal to increase the power level of the processor based on a first value indicating an average of the workload rate over an up reference time, to decrease the power level of the processor based on a second value indicating an average of the workload rate over a down reference time, and to decrease the power level of the processor based on a third value indicating an average of the detected workload rate over a static reference time, the static reference time being longer than the down reference time.

14. The power management apparatus of claim 13, wherein the workload detector is configured to detects the workload rate of the processor at intervals of a unit reference time and successively generates a plurality of unit workload rates.

15. The power management apparatus of claim 14, wherein the power management unit comprises:
  a calculation unit configured to receive the workload rates from the workload detector and generate a comparison signal indicating the increase or decrease of the power level of the processor.

16. The power management apparatus of claim 15, wherein the calculation unit comprises:
  a history unit including a plurality of delay units, each delay unit configured to store a unit workload rate received from a previous delay unit and output the stored unit workload rate to a next delay unit after a desired time;
  an amplification unit including a plurality of amplifiers, each of the plurality of amplifiers configured to output an amplified corresponding unit workload rate received from the history buffer;
  a summing unit including a plurality of adders, each adder configured to sum an output of corresponding amplifiers, the corresponding amplifiers including each amplifier outputting an amplified unit workload rate to the adder; and
  a division unit including a plurality of dividers, each divider configured to divide an output of a given adder by a corresponding sum of gains of corresponding amplifiers, the corresponding amplifiers including each amplifier outputting an amplified unit workload rate to the given adder.

17. A method of power management, comprising:
  detecting a workload rate of a processor to generate a plurality of unit workload rates of the processor consecutively by detecting the workload rate of the processor at intervals of a unit reference time;
  increasing a power level of the processor based on a first value, the first value being an average of the detected workload rates over an up reference time;
  decreasing the power level of the processor based on a second value, the second value being an average of the detected workload rates over a down reference time, the down reference time being longer than the up reference time;
  multiplying a first unit workload rate of the plurality of unit workload rates by a first weight value; and
  multiplying a second unit workload rate of the plurality of unit workload rates by a second weight value,
  wherein the first weight value is larger than the second weight value if the first unit workload rate indicates a more recent workload rate of the processor than the second unit workload rate.

* * * * *